(12) United States Patent
Ling et al.

(10) Patent No.: US 11,372,727 B2
(45) Date of Patent: Jun. 28, 2022

(54) METHOD, DEVICE, AND COMPUTER-READABLE STORAGE MEDIUM FOR MANAGING STORAGE SYSTEM

(71) Applicant: EMC IP Holding Company LLC, Hopkinton, MA (US)

(72) Inventors: Qinghua Ling, Beijing (CN); Xin Zhong, Beijing (CN); Yue Yang, Beijing (CN); Yan Shao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 201 days.

(21) Appl. No.: 16/825,055

(22) Filed: Mar. 20, 2020

(65) Prior Publication Data

US 2020/0341861 A1    Oct. 29, 2020

(30) Foreign Application Priority Data

Apr. 24, 2019    (CN) .......................... 201910336010.5

(51) Int. Cl.
*G06F 11/14*    (2006.01)
*G06F 11/20*    (2006.01)
*G06F 11/30*    (2006.01)

(52) U.S. Cl.
CPC ...... *G06F 11/1464* (2013.01); *G06F 11/1451* (2013.01); *G06F 11/1461* (2013.01); *G06F 11/1469* (2013.01); *G06F 11/2082* (2013.01); *G06F 11/3034* (2013.01); *G06F 2201/84* (2013.01)

(58) Field of Classification Search
CPC ............. G06F 11/1464; G06F 11/1451; G06F 11/1461; G06F 11/1469; G06F 11/2082; G06F 11/3034; G06F 2201/84; G06F 11/1435; G06F 16/128; G06F 16/178
USPC .......................................................... 711/162
See application file for complete search history.

(56) References Cited

U.S. PATENT DOCUMENTS

| | | |
|---|---|---|
| 7,383,463 B2 | 6/2008 | Hayden et al. |
| 8,898,409 B1 | 11/2014 | Natanzon et al. |
| 9,189,341 B1 | 11/2015 | Natanzon et al. |
| 10,705,918 B1 | 7/2020 | Hu et al. |
| 10,747,465 B2 | 8/2020 | Shang et al. |
| 10,747,606 B1 | 8/2020 | Shemer et al. |
| 10,831,718 B1 | 11/2020 | Bono |
| 10,891,205 B1 | 1/2021 | Trulli, Jr. et al. |
| 11,023,433 B1 | 6/2021 | Datta et al. |
| 11,099,777 B2 | 8/2021 | Haravu et al. |
| 2014/0344216 A1* | 11/2014 | Abercrombie .......... G06F 16/27 707/609 |
| 2017/0185323 A1* | 6/2017 | Kaushik .............. G06F 11/1471 |

* cited by examiner

*Primary Examiner* — Yair Leibovich
(74) *Attorney, Agent, or Firm* — BainwoodHuang

(57) ABSTRACT

Techniques for managing a storage system involve at a second device: in response to receiving a command to failback a first device, determining a snapshot synchronized between the second device and the first device before a failure of the first device, wherein the first device has been failed over to the second device; causing the first device to be restored based on the snapshot; determining a change in latest data of the second device relative to the snapshot; and synchronizing the change to the first device.

22 Claims, 7 Drawing Sheets

METHOD, DEVICE, AND COMPUTER-READABLE STORAGE MEDIUM FOR MANAGING STORAGE SYSTEM

CROSS REFERENCE TO RELATED APPLICATION

This application claims priority to Chinese Patent Application No. CN201910336010.5, on file at the China National Intellectual Property Administration (CNIPA), having a filing date of Apr. 24, 2019, and having "METHOD, DEVICE, AND COMPUTER-READABLE STORAGE MEDIUM FOR MANAGING STORAGE SYSTEM" as a title, the contents and teachings of which are herein incorporated by reference in their entirety.

FIELD

Embodiments of the present disclosure generally relate to a storage system, and more specifically, to a method and device for managing storage system (especially for failback) and a computer-readable storage medium.

BACKGROUND

Remote mirroring products based on a storage system can mirror local production data to a remote or a disaster recovery (DR) terminal to provide a block-based storage system disaster recovery solution. The solution provides end-to-end data protection by replicating the contents on the primary device to the secondary device. For example, such a remote mirroring product can be a synchronous product, i.e., synchronizing data between a local storage system and a remote storage system in real time.

SUMMARY

Embodiments of the present disclosure provide a method and device for managing a storage system, a computer-readable storage medium, and a computer program product.

In a first aspect, there is provided a method for managing a storage system. The method includes at a second device: in response to receiving a command to failback a first device, determining a snapshot synchronized between the second device and the first device before a failure of the first device, wherein the first device has been failed over to the second device; causing the first device to be restored based on the snapshot; determining a change in latest data of the second device relative to the snapshot; and synchronizing the change to the first device.

In a second aspect, there is provided a method for managing a storage system. The method includes at a first device: determining a snapshot synchronized between a second device and the first device before a failure of the first device, wherein the first device has been failed over to the second device; restoring the first device based on the snapshot; and receiving a change in the latest data on the second device relative to the snapshot from the second device to synchronize the change to the first device.

In a third aspect, there is provided a device for managing a storage system, including: a processing unit; and a memory coupled to the processing unit and including instructions stored thereon, the instructions, when executed by the processing unit, causing the device to perform acts including: in response to receiving a command to failback another device, determining a snapshot synchronized between the device and the other device before a failure of the other device, wherein the other device has been failed over to the device; causing the other device to be restored based on the snapshot; determining a change in latest data of the device relative to the snapshot; and synchronizing the change to the other device.

In a fourth aspect, there is provided a device for managing storage system, including: a processing unit; and a memory coupled to the processing unit and including instructions stored thereon, the instructions, when executed by the processing unit, causing the device to perform acts including: determining a snapshot synchronized between another device and the device before a failure of the device, wherein the device has been failed over to the other device; restoring the device based on the snapshot; and receiving a change in the latest data on the other device relative to the snapshot from the other device to synchronize the change to the device.

In a fifth aspect, there is provided a computer-readable storage medium including machine-executable instructions stored thereon which, when executed by at least one processor, cause the at least one processor to perform the method according to the first aspect.

In a sixth aspect, there is provided a computer-readable storage medium including machine-executable instructions stored thereon which, when executed by at least one processor, cause the at least one processor to perform the method according to the second aspect.

In a seventh aspect, there is provided a computer program product stored on a computer-readable medium and including machine-executable instructions which, when executed, cause a machine to perform the method according to the first aspect.

In an eighth aspect, there is provided a computer program product stored on a computer-readable medium and including machine-executable instructions which, when executed, cause a machine to perform the method according to the second aspect.

The Summary of the Invention is provided to introduce a selection of concepts in a simplified form, which are further described in the Detailed Description. The Summary of the Disclosure is not intended to identify key features or essential features of the present disclosure.

BRIEF DESCRIPTION OF THE DRAWINGS

The above and other objectives, features, and advantages of example embodiments of the present disclosure will become more apparent from the following detailed description with reference to the accompanying drawings, in which the same reference signs refer to the same elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred embodiments disclosed herein will be described in detail below with reference to the accompanying drawings. Although the drawings illustrate the preferred embodiments of the present disclosure, it would be appreciated that the present disclosure can be implemented in various forms but cannot be limited by the embodiments described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

Figure 1:
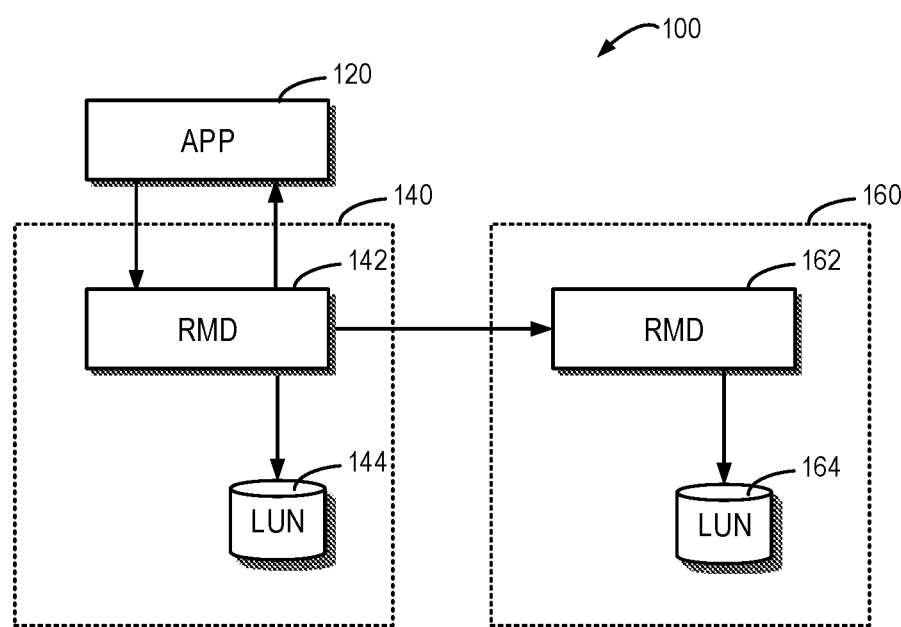
FIG. 1 is a schematic diagram illustrating a write operation in file system synchronous replication.

FIG. 1 is a diagram illustrating a write operation in a file system (FS) synchronous replication process in a storage system 100. When a FS Synchronous Replication is created, Remote Mirror Drivers (RMD) 142 and 162 are auto-inserted into data path of the file systems on a first device 140 and a second device 160, respectively. The first device 140 may also be referred to as a Primary or a local side, and the second device 160 may also be referred to as a Secondary or a remote side. It should be understood that although FIG. 1 shows only one Secondary, it will be understood by those skilled in the art that more than one Secondary can be used as well.

As shown in FIG. 1, the first device 140 (e.g., RMD 142) receives a write request from an application 120 and splits the write request into two write requests, one of which is provided to a underlying file system or a logical unit or a logical unit number (LUN) 144 on the local side, and the other of which is provided to the second device 160 on the remote side. The RMD 162 of the second device 160 provides the write request to a corresponding LUN 164. After the two write requests are completed, the RMD 142 will receive a response indicating that the two write requests are completed respectively and provide the application 120 with a response indicating the completion of the write request.

Figure 2:
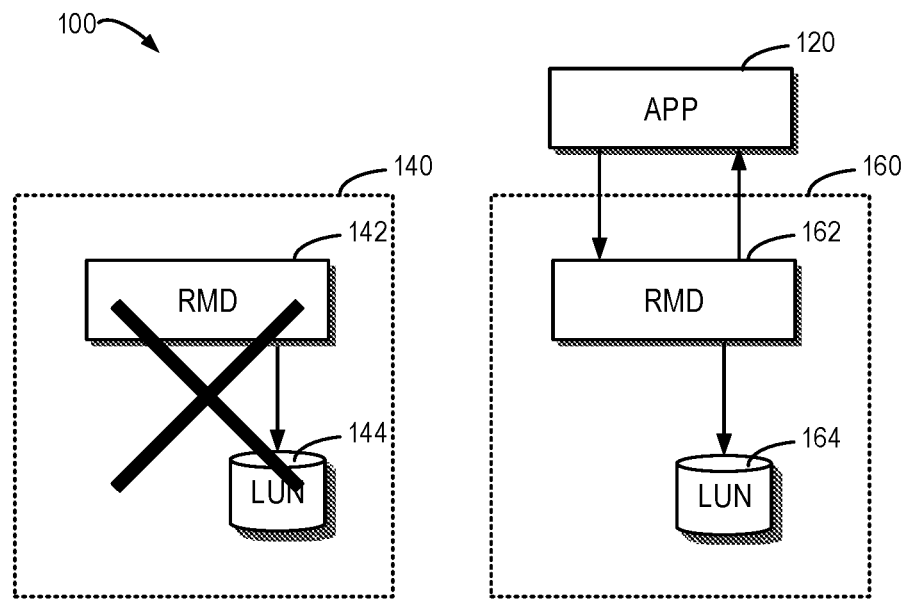
FIG. 2 is a schematic diagram of a write operation when the primary device fails.

The data on the file system of the Primary and the Secondary are identical when the FS Synchronous Replication is running. However, during the operation, the Primary may fail; for example, the storage array may reboot, be powered off, or the like. As a result, the Primary cannot serve the application 120 for IO requests. In this case, FS Synchronous Replication needs failover to the Secondary, so that the second device 160 serves the application 120 for IO requests. FIG. 2 shows a diagram of a write operation when Primary fails.

As shown in FIG. 2, the first device 140 cannot serve due to a failure or any other reasons, such that the first device 140 needs failover to the second device 160. The second device 160 receives the write request from the application 120 and provides the write request to the LUN 164. After the write request is completed, the RMD 162 will receive a response indicating the completion of the write request and provide the application 120 with the response indicating the completion of the write request.

After the first device 140 subsequently comes back, it is generally required to failback the FS Synchronous Replication to the first device 140 to allow the first device 140 serves the application 120. Failback of FS Synchronous Replication creates remote mirror between primary and secondary file systems. Then, since the original Secondary (i.e., the second device 160) now contains hot data, it is required to synchronize the data from the second device 160 back to the first device 140 to make sure they are identical. Then, the first device 140 is switched back to Primary and is operated as shown in FIG. 1.

Unplanned failover is usually used in scenarios when Primary cannot provide services to application, such as shutdown, power outage, hardware fault, or network outage in the Primary side. If Primary could not be recovered in reasonable time frame, usually tens of seconds, the user needs to failover replication session by force to let Secondary provide services to application. Otherwise, the service will be unavailable in pretty long period.

In these situations, the status of the Primary file system is unknown. It may be corrupted or inconsistent due to unexpected fault, and there is no reliable way to guarantee the consistency between Primary and Secondary. In this way, the mirror in RMD will be destroyed in unplanned failover.

When the first device 140 recovers, the application traffic must be switched back from the second device 160 to the first device 140. Before doing this, it is mandatory to synchronize hot data on the second device 160 to the first device 140 to make them identical, otherwise there will be data loss.

While failing back, FS Synchronous Replication treats the file system of the first device 140 as dirty and unknown and copies all data from the second device 160 to the first device 140, which is a full copy. The session can only be switched back to the first device 140 after the full copy is completed and the first device and the second device become identical in this regard.

As we know, the full copy is very expensive. For example, if a file system is 16 TB in size, and the sync speed is 160 MB/s, the full copy time is 1.16 days.

This lengthy full copy process is painful for customers, especially in the cases when FS Synchronous Replication has limited network connection between two sides. Usually, it is not necessary for users, especially in the cases when only limited hot data occur during the whole stage, including unplanned failover and failback stages.

Figure 3:
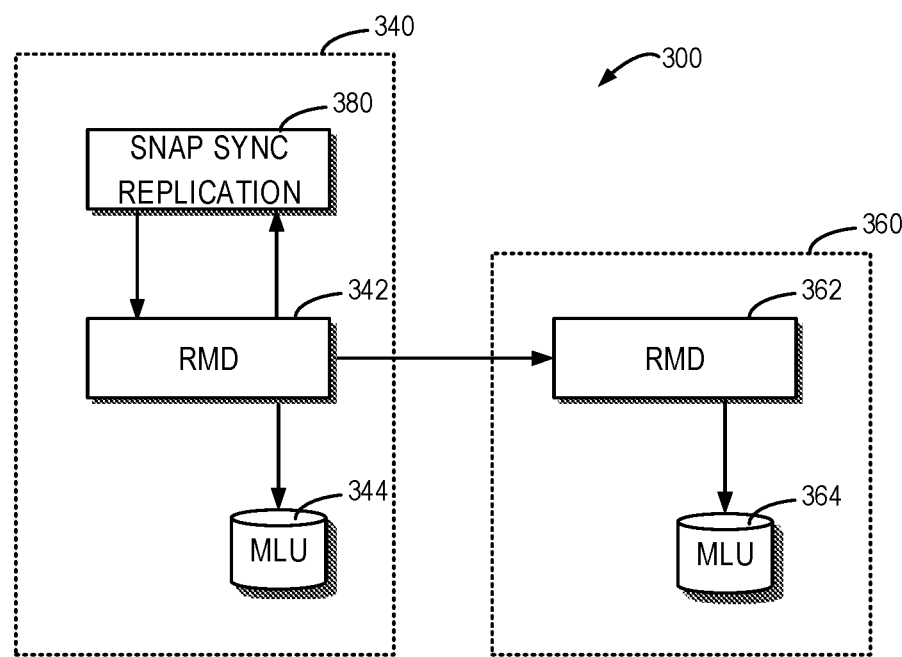
FIG. 3 is a schematic diagram of a snapshot sync replication operation in accordance with some embodiments of the present disclosure.

FIG. 3 illustrates a diagram of Snapshot Sync Replication architecture in accordance with some embodiments of the present disclosure. The first device 340 and the second device 360 may correspond to the first device 140 and the second device 160 illustrated in FIGS. 1 and 2 respectively, and the RMDs 342 and 362 may correspond to the RMD 142 and 162 illustrated in FIGS. 1 and 2 respectively.

After creating FS Synchronous Replication, we need to assign Snapshot Scheduler to the primary file system of the first device 340. The Snapshot Scheduler will create a snapshot such as a read-only snapshot for the primary file system periodically, for example, every one hour.

A Snapshot Sync Replication 380 replicates the snapshot created on the Primary to the Secondary. For example, the Snapshot Sync Replication 380 can package the snapshot creation operation on the first device 340 as IOs and send the IOs to underlying driver, for example, the RMDs 342. RMD 342 can synchronize the IOs to the second device 360. In this way, the same IO sequence will be provided to the second device 360 and the first device 340, thereby creating the same snapshot.

For each snapshot, it is assigned an identifier (for example, an UUID) as a signature. In addition, the RMD 342 sends an IO request to create a snapshot to the underlying Mapped Logical Unit Driver (MLU) 344. MLU, also called local orchestration, is provided for local snapshot creation. The MLU 344 performs IO operations on the underlying file system (e.g., LUN) to create a snapshot.

With the support of Snapshot Sync Replication, RMD 342 replicates this Snapshot to the second device 360. For example, RMD 342 sends an IO request to create a snapshot to RMD 362, and RMD 362 sends a corresponding IO request to the underlying MLU 364. The MLU 364 performs IO operations on the underlying file system (e.g., LUN) to create a snapshot. In addition, UUID is also replicated to the second device 360; therefore, each pair of snapshots shares the same UUID signature.

As shown in FIG. 3, Snap with UUID will be created on the first device 340 and the second device 360 under the same IO sequence, so they are identical and consist on a common base.

In connection with the Snapshot Sync Replication 380, a creation process of mirror snapshot is illustrated. However, the user can create a snapshot manually, if necessary. While the FS Synchronous Replication is running, it creates new snapshots and some older snapshots may expire. The source and destination file systems of the first device 340 and the second device 360 will have available common bases.

Figure 4:
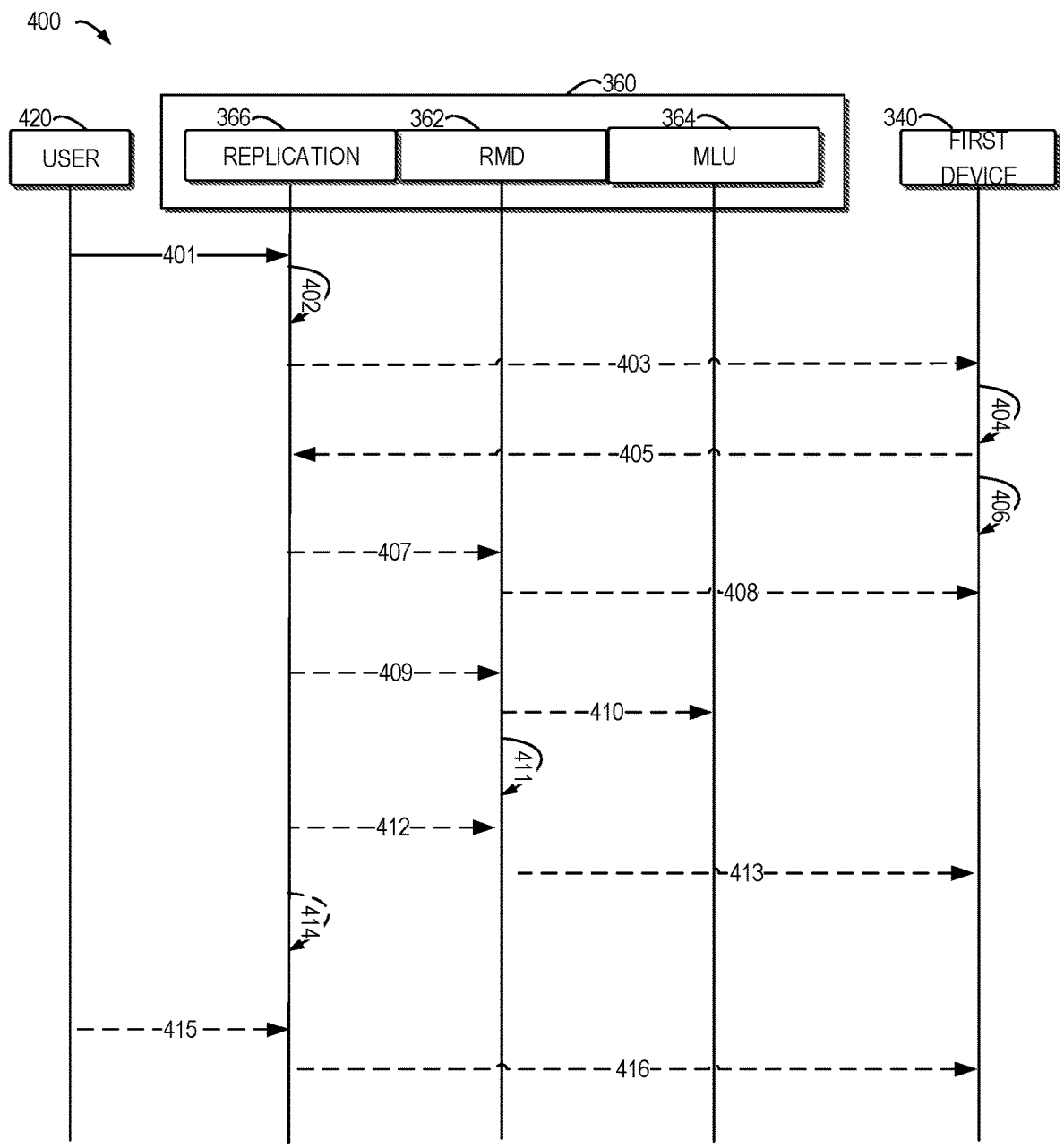
FIG. 4 is an interaction diagram of a failback method in accordance with some embodiments of the present disclosure.

FIG. 4 illustrates an interaction diagram of a failback method 400 in accordance with some embodiments of the present disclosure. The failback method 400 can be applied to the architecture 300 as shown in FIG. 3. However, it should be understood that the failback method 400 can also be applied to any other suitable architecture. For convenience, the failback method 400 is described below in conjunction with the architecture 300 as shown in FIG. 3.

Due to the failover, the second device 360 is running as the Primary to serve the IO requests. The failback requires that the first device 340 be restored to the Primary to serve IO requests and the second device 360 is still used as Secondary. During failback, both the first device 340 and the second device 360, along with the file systems and their snapshots are available to ensure smooth failback.

In some embodiments, the failback includes two phases, one of which is to resume FS Synchronous Replication to transfer the latest data from the second device 360 to the first device 340, and the other of which is to reverse the direction of the FS Synchronous Replication, so that replication will be recovered to original direction before the unplanned failover.

As shown in FIG. 4, in addition to RMD 362 and MLU 364, the second device 360 includes a synchronous replica engine 366 for performing a synchronous replication.

At step 401, user 402 triggers the failback operation at the second device 360, the user 402 starts synchronous replica engine 366 to transfer hot data on the second device 360 to the first device 340.

Then, the second device 360 and the first device 340 determine (for example, by searching) a common base and run snap restore. For example, at step 402, the second device 360 lists all sync replicated snapshots, and send their signatures to the first device 340 at step 403. The first device 304 receives these signatures and determines a common base on the basis of these signatures. For example, the first device 340 also lists all sync replicated snapshots to match a latest common base by signature; for example, the first device 340 checks the snapshots from newest to oldest and compares UUID signatures of the snapshots between two devices. If a pair is found, the first device 340 sends the signature to the second device 360 at step 405. The pair of snapshots forms a common base and will be selected for further action.

After a common base is identified, the first device 340 begins Snapshot Restore at step 406 to the snapshot as a common base. Snapshot restore does not involve any data move; it is expected to be finished quickly. It should be understood that step 406 can be implemented using any snapshot recovery technique currently known or to be developed in the future, and the disclosure is not limited herein.

At step 407, the synchronous replica engine 366 instructed or requests the RMD 362 to re-create mirror and collate mirror size for file system or size of underlying storage space if necessary. After unplanned failover, the sync replication is in a "failed-over" state, which is similar as "deactivated". Failback needs to reactivate this sync replication between the first device 340 and the second device 360. At this moment, the file systems are not consistent between the first device 340 and the second device 360. The second device 360 contains the latest data, and the first device 340 is just restored to a previous status. Therefore, the re-established mirror will be set to 'paused' and marked as 'out-of-sync' after creation. Then, it will check whether mirror size for file system or size of underlying storage space matches or not. If not, the size of corresponding storage space in the first device 340 will be updated.

At step 408, the RMD 362 sends request to the first device 340 to activate a mirror session and set its state as "paused." In this case, any IO write request will write to the second device 360 only, and set corresponding bits in a record (e.g., a bitmap) to indicate the differences between the first device 340 and the second device 360. For example, each bit in the bitmap can indicate whether a storage unit is identical. For example, the RMD 362 handles this step automatically. For example, when a slave mirror on Secondary is lost for various reasons, the record is automatically called.

At step 409, the synchronous replica engine 366 instructs or requests the RMD 362 to determine the difference between the common base and the latest data. At step 410, the RMD 362 will send a request to MLU 364 to determine the difference. For example, the MLU 364 may call the interface for calculating the difference in order to obtain the difference. At step 411, the RMD 362 marks dirty bits in the record to reflect the differences. The bits at step 409 and step 408 could be overlapped, but never miss any change. Finally, the record contains dirty bits for both new IO write requests and the determined difference from the snapshot.

At step 412, the synchronous replica engine 366 instructs the RMD 362 to start resync mirror, to request RMD 362 to start data syncing based on the dirty bits recorded in the record. Thus, no full copy is needed. At step 314, the RMD 362 synchronizes the data based on the dirty bits recorded in the record. At step 414, the synchronous replica engine 366 waits for replication completion.

Once the data syncing is finished, failback will run into the second phase to reverse the replication direction of the sync replication session, promotes the first device 340 as the Primary to provide service to the application. For example, at step 415, the user 420 instructs the synchronous replica engine 366 to reverse the replication direction of the sync replication session and the synchronous replica engine 366 sends a request to the first device 340 to reverse the replication direction.

The detailed flow of the failover is described above in connection with FIG. 4; however, it should be understood that FIG. 4 does not show specific modules in the first device 340 for the sake of brevity. Additionally, although FIG. 4 illustrates a layered drive system in conjunction with the second device 360, the second device 360 may be implemented using more or fewer drive systems. For example, the functions of the layered drivers can be integrated on one-layer driver, and so on.

The above describes the architecture and process of failover in conjunction with FS Synchronous Replication. However, it should be understood that the above method can also be applied to any other suitable synchronous replication, such as block (LUN) synchronous replication. In addition, steps may be added, deleted, replaced or combined in FIG. 4 without departing from the spirit and scope of the embodiments of the present disclosure.

Figure 5:
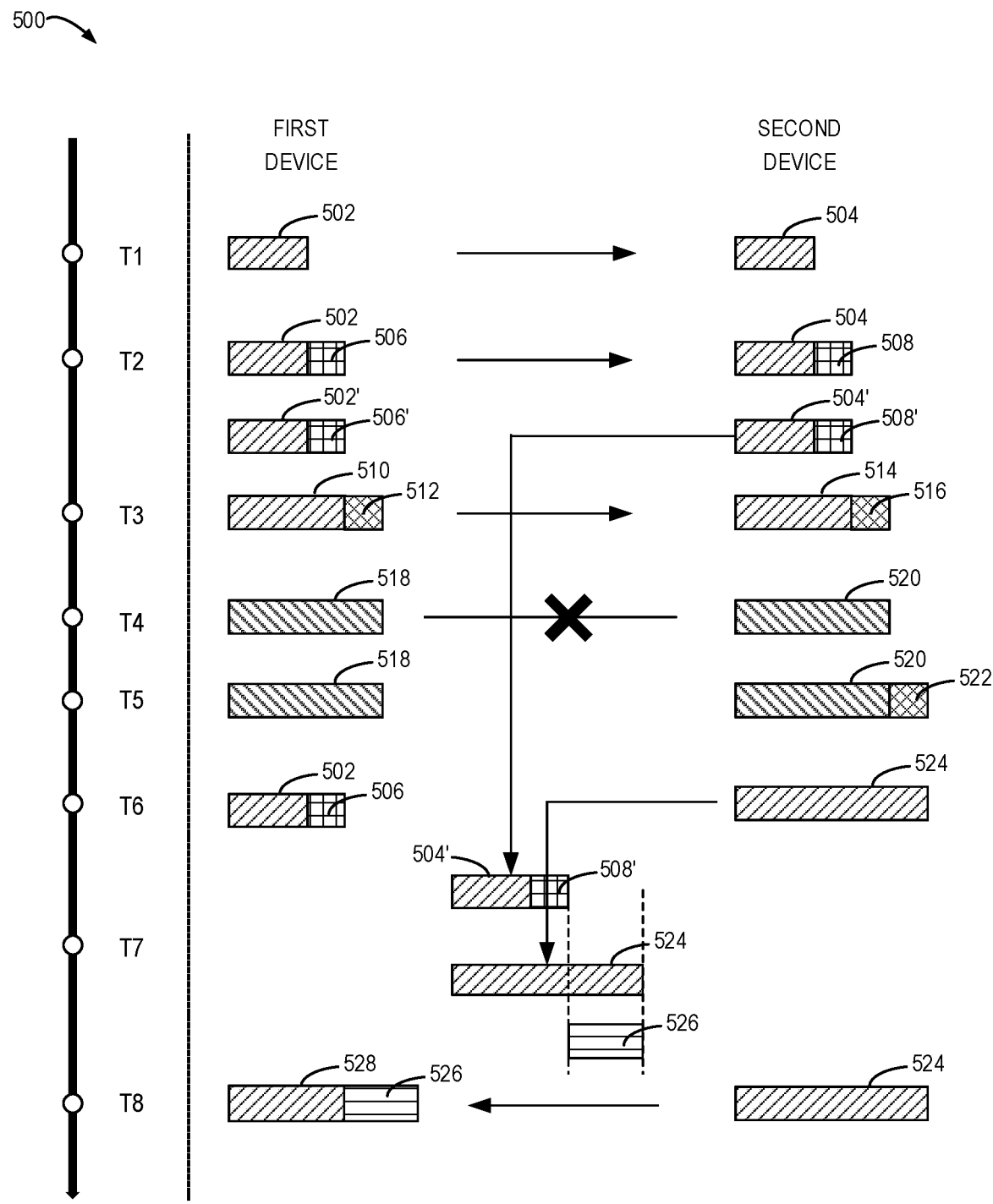
FIG. 5 is a schematic diagram of a failback method in accordance with some embodiments of the present disclosure.

FIG. 5 illustrates a schematic diagram of a failback method 500 in accordance with some embodiments of the present disclosure. As shown in FIG. 5, at time T1, the FS synchronization session is created, in which the first device runs as a Primary and the second device runs as a Secondary. At this point, the write request will be mirrored to the second device for being processed by the second device while being processed by the first device. At this point, file systems 502 and 504 are fully synchronized.

At time T2, a snapshot is created at the first device and the second device respectively. For example, snapshots can be created on a regular basis. Due to the presence of a new write request between times T1 and T2, regions 506 and 508 are added into the file systems 502 and 504 respectively, where regions 506 and 508 are fully synchronized. As shown in FIG. 5, the snapshot at the first device includes a portion 502' corresponding to the file system 502 and a portion 506' corresponding to the newly added region 506. Additionally, the snapshot at the second device includes a portion 504' corresponding to the file system 504 and a portion 508' corresponding to the newly added region 508.

At time T3, since more data is written into the first device and the second device, the file systems of the first device are added with portions 512 and 516 respectively. In addition, the file systems corresponding to the time T2 are collectively indicated as 510 and 514 respectively.

At time T4, failure or disaster occurs on the first device, so that there is a problem with synchronization between the first device and the second device. File system 518 collectively represents 510 and 512, and file system 520 collectively represents 514 and 516.

At time T5, the first device is failed over to the second device. Additionally, the second device is written with new data 522, while the file system 518 in the first device remains unchanged.

At time T6, after the first device comes back to normal, a failback is initiated. Based on snapshots 502' and 506', the first device restores file systems 502 and 506. Additionally, at the second device, reference numeral 524 is representative of file systems 520 and 522.

At time T7, the second device determines a difference 526 between file system 524 and snapshots 504' and 508'. For example, this can be done by a record in the RMD. At time T8, the difference 526 is synchronized to the first device, where file system 528 represents the file systems 502 and 506 restored at time T6. In addition, the write IO during the failback period will also be synchronized by the RMD. Finally, the FS synchronization session will be reversed to the original direction. In this way, the failback is all completed, and the first device and the second device will run based on the state of time T1.

In one embodiment, FS size is 16 TB, snapshot creation interval is 1 hour, host IO rate is 10 MB/s, sync rate is 160 MB/s and Primary unavailable time is 1 hour. If full copy is needed, the failback needs 1.16 days to sync FSs. But in accordance with the embodiment in FIG. 5, the failback needs only around 500 seconds to sync FSs. Specific calculation is show as below in Table 1.

TABLE 1

| item | value | calculation |
| --- | --- | --- |
| Newest common base | 120 minutes | Primary unavailable time + snapshot create interval |
| Snapshot diff amount | 72000 MB | Host IO rate * 120 minutes |
| Transfer snapshot diff time | ~450 seconds | Snapshot diff amount/sync rate |
| New host IO during syncing snapshot diff | 4500 MB | Transfer snapshot diff time * host IO rate |
| Additional sync time | ~30 seconds | New Host IO amount/sync rate |
| Total data transferring | 76500 MB | 72000 MB + 4500 MB |
| Total sync time | 480 seconds | 450 seconds + 30 seconds |

As show in Table 1, the sync time is reduced from 1.16 days to 480 seconds in this example. Hence, the embodiments of the present disclosure can speed up failback operation.

Figure 6:
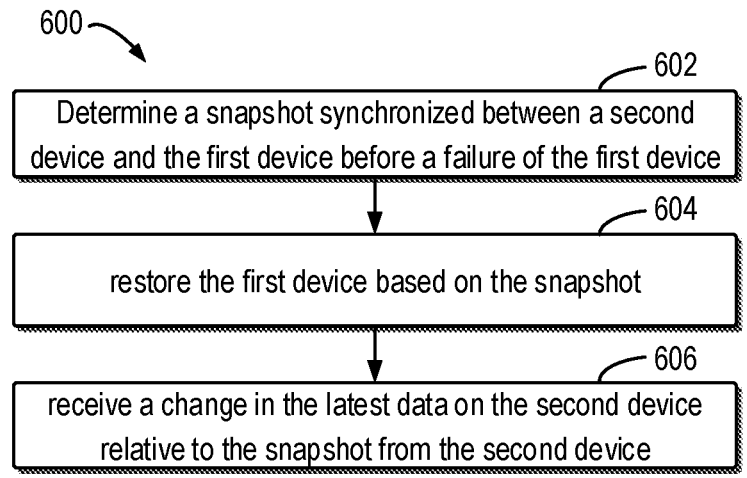
FIG. 6 is a flowchart of a failback method in accordance with some embodiments of the present disclosure.

FIG. 6 illustrates a flow chart of a failback method 600 in accordance with some embodiments of the present disclosure. The method 600 can be performed at the first device 340 as shown in FIG. 3 and can be implemented by an interaction diagram as shown in FIG. 4. However, it should be understood that the method 600 can also be implemented in any other suitable environment.

At 602, the first device 340 determines a snapshot that is synchronized between the second device 360 and the first device 340 before a failure of the first device 340. The first device 340 has been failed over to the second device 360.

In some embodiments, the snapshot may be determined by receiving a first identifier list of snapshots on the second device 360 from the second device 360; obtaining a second identifier list of snapshots on the first device 340; determining identifiers in the first identifier list and the second identifier list that match each other; and determines the snapshot based on a latest identifier of the identifiers that match each other. For example, the identifier can be a UUID as described above.

At 604, the first device 340 restores the first device 340 based on the snapshot determined at 602.

At 606, the first device 340 receives, from the second device 360, a change or a difference in the latest data on the second device 360 relative to the snapshot to synchronize the change to the first device 340. For example, the change is determined based on a record indicating a storage region that was updated in the second device 360 from the failure of the first device 340.

In some embodiments, the method 600 further includes in response to synchronizing the change to the first device 340, receiving a write request from an application and sending the write request to the second device 360. For example, the first device is set as Primary, the second device is set as Secondary, and the synchronous write request is performed according to the method as shown in FIG. 2.

In some embodiments, the method 600 further includes in response to receiving, from the second device 360, a request to establish a mirror of a predetermined storage region of the second device 360, initializing a predetermined storage region on the first device 340 with a same size as the predetermined storage region of the second device 360; and in response to receiving the change, synchronizing the change to the predetermined storage region of the first device 340. For example, this can be achieved by steps 407 and 408 shown in FIG. 4. Additionally, in response to receiving the change, the change is synchronized to the predetermined storage region on the first device 340. This can be achieved, for example, by steps 412 and 413 shown in FIG. 4.

Figure 7:
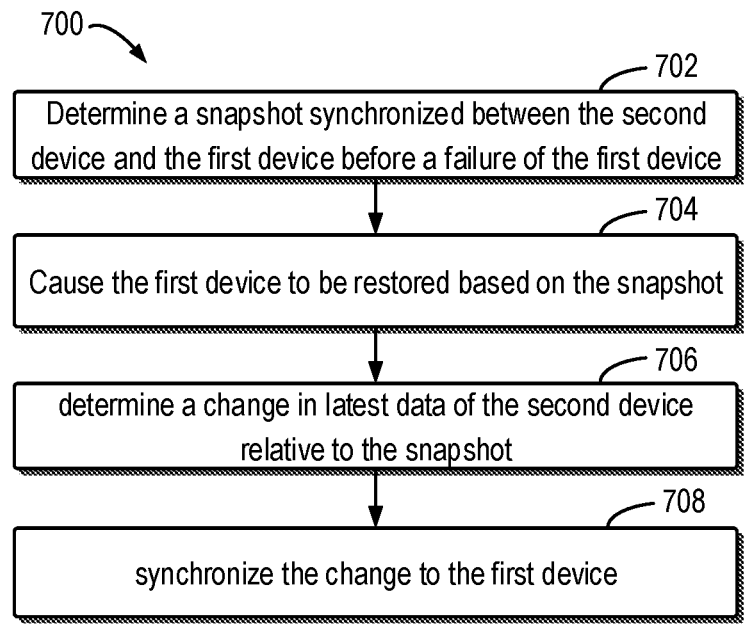
FIG. 7 is a flowchart of a failback method in accordance with some embodiments of the present disclosure.

FIG. 7 illustrates a flow chart of a failback method 700 in accordance with some embodiments of the present disclosure. The method 700 can be performed at second device 360 as shown in FIG. 3 and can be implemented by an interaction diagram as shown in FIG. 4. However, it should be understood that method 700 can also be implemented in any other suitable environment.

At 702, in response to receiving a command to failback the first device 340, the second device 360 determines a snapshot synchronized between the second device 340 and the first device 340 before a failure of the first device 340. The first device 340 has been failed over to the second device 360.

In some embodiments, the snapshot may be determined by obtaining a first identifier list of snapshots on the second device 360 for sending to the first device 340; receiving an identifier of the snapshot from the first device 340, wherein the identification is determined by the first device 340 based on a latest identification of the mutually matched identifiers in the first identifier list and the second identifier list of the snapshots on the first device 340.

At 704, the second device 360 causes the first device 340 to be restored based on the snapshot.

At 706, the second device 360 determines a change in the latest data of the second device 360 relative to the snapshot. In some embodiments, the change is determined by obtaining a record indicating a storage region that was updated in the second device 360 from the failure; and determining the change based on the record.

At 708, the second device 360 synchronizes the change to the first device 340.

In some embodiments, the method 600 further includes the second device 360 receiving a write request from the first device 340 in response to the change is sync to the first device 340, wherein the first device 340 receives the write request from the application.

In some embodiments, the method 600 further includes the second device 360 transmitting a request to the first device 340 to establish a mirror of the predetermined storage area of the second device 360 on the first device 340. In response to determining the change, the second device 360 synchronizes the change to the mirror on the first device 340.

Figure 8:
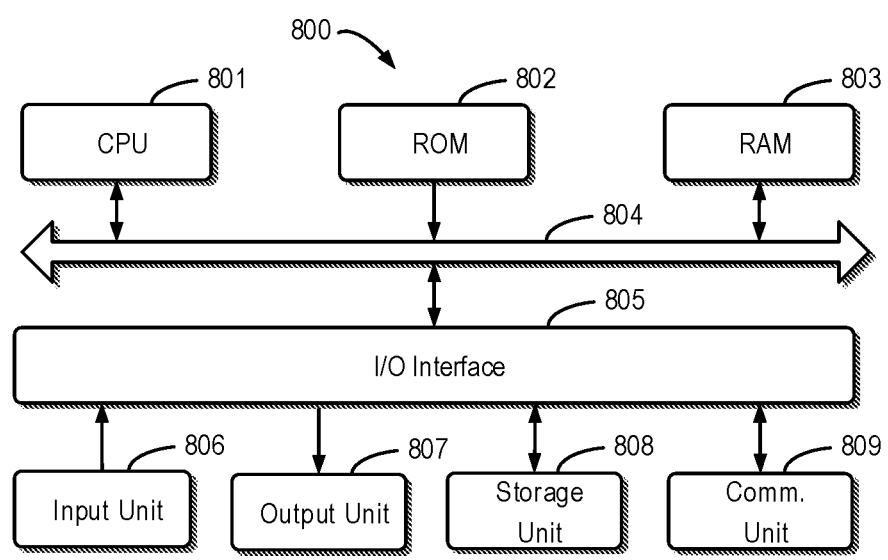
FIG. 8 is a block diagram illustrating an example device that can be used to implement embodiments of the present disclosure.

FIG. 8 shows a schematic block diagram of a device 800 that can be used to implement embodiments of the present disclosure. As shown in FIG. 8, the device 800 includes a central processing unit (CPU) 801 that can perform various appropriate actions and processes in accordance with computer program instructions stored in read only memory (ROM) 802 or loaded into random access memory (RAM) 803 from storage unit 808. In the RAM 803, various programs and data required for the operation of the device 800 can also be stored. The CPU 801, the ROM 802, and the RAM 803 are connected to each other through a bus 804. An input/output (I/O) interface 805 is also coupled to the bus 804.

A plurality of components in the device 800 are coupled to I/O interface 805, including: an input unit 806, such as a keyboard, mouse, etc.; an output unit 807, such as various types of displays, speakers, etc.; a storage unit 808, such as a disk, an optical disk, etc.; and a communication unit 809, such as a network card, a modem, a wireless communication transceiver, and the like. The communication unit 809 allows device 800 to exchange information/data with other devices over a computer network such as the Internet and/or various telecommunication networks.

The various processes and processes described above, such as method 400-700, may be performed by processing unit 501. For example, in some embodiments, method 400-700 can be implemented as a computer software program that is tangibly embodied in a machine readable medium, such as storage unit 508. In some embodiments, some or the entire computer program may be loaded and/or installed onto device 500 via ROM 502 and/or communication unit 509. One or more actions of method 300 described above may be performed when a computer program is loaded into RAM 503 and executed by CPU 501.

The present disclosure can be a method, device, system and/or computer product. The computer product can include a computer readable storage medium with computer readable program instructions for performing various aspects of the present disclosure thereon.

A computer readable storage medium may be a tangible device that can hold and store the instructions used by the instruction execution device. The computer readable storage medium can be, for example, but not limited to, an electrical storage device, a magnetic storage device, an optical storage device, an electromagnetic storage device, a semiconductor storage device, or any suitable combination of the foregoing. More specific examples (non-exhaustive list) of computer readable storage media include: a portable computer disk, hard disk, a random access memory (RAM), a read only memory (ROM), an erasable programmable read only memory (EPROM) or flash memory), a static random access memory (SRAM), a portable compact disk read only memory (CD-ROM), a digital versatile disk (DVD), a memory stick, a floppy disk, a mechanical encoding device, for example, the hole card with instructions stored thereon or raised structure in groove, and any suitable combination of the above. The computer readable storage medium as used herein is not to be interpreted as a transient signal itself, such as a radio wave or other freely propagating electromagnetic wave, an electromagnetic wave propagating through a waveguide or other transfer medium (e.g., a light pulse through a fiber optic cable), or the electrical signal transferred through a wire.

The computer readable program instructions described herein can be downloaded from a computer readable storage medium to various computing/processing devices, or downloaded to an external computer or external storage device over a network, such as the Internet, a local area network, a wide area network, and/or a wireless network. The network may include copper transfer cables, fiber optic transfers, wireless transfers, routers, firewalls, switches, gateway computers, and/or edge servers. A network adapter card or a network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, source code or object code written or in any combination of one or more programming languages including object oriented programming languages, such as Smalltalk, C++ and so on, as well as conventional procedural programming languages, such as "C" language or similar programming language. The computer readable program instructions can be executed entirely on the user's computer, partly on the user's computer, as a stand-alone software package, partly on the user's computer and partly on the remote computer, or entirely on the remote computer or server. In the case of a remote computer, the remote computer can be connected to the user's computer through any kind of network, including a local area network (LAN) or wide area network (WAN), or can be connected to an external computer (e.g., using an Internet service provider to access the Internet connection). In some embodiments, the customized electronic circuit, such as a programmable logic circuit, a field programmable gate array (FPGA), or a programmable logic array (PLA), can be customized by utilizing state information of computer readable program instructions. The electronic circuit can execute computer readable program instructions to implement various aspects of the present disclosure.

Various aspects of the disclosure are described herein with reference to flowcharts and/or block diagrams of methods, devices (systems) and computer products according to embodiments of the present disclosure. It will be understood that each block of the flowchart illustrations and/or block diagrams, and combinations of blocks in the flowcharts and/or block diagrams can be implemented by computer readable program instructions.

These computer readable program instructions can be provided to a processing unit of a general purpose computer, a special purpose computer or other programmable data processing apparatus to produce a machine such that when the instructions are executed by processing unit via a computer or other programmable data processing apparatus, devices that implement the functions/acts specified in one or more of the flowcharts and/or block diagrams are produced. The computer readable program instructions can also be stored in a computer readable storage medium that causes the computer, programmable data processing device, and/or other device to operate in a particular manner, such that the computer readable medium storing the instructions includes an article of manufacture that includes instructions for implementing various aspects of the functions/acts recited in one or more blocks of the flowcharts and/or block diagrams.

Computer readable program instructions can also be loaded onto a computer, other programmable data processing device, or other device to perform a series of operational steps on a computer, other programmable data processing device or other device to produce a process that a computer is implemented such that instructions executed on a computer, other programmable data processing apparatus, or other device implement the functions/acts recited in one or more of the flowcharts and/or block diagrams.

The flowchart and block diagrams in the drawings illustrate the architecture, functionality, and operation of possible implementations of devices, methods, and computer products according to various embodiments of the present disclosure. In this regard, each block in the flowchart or block diagram can represent a module, a program segment, or a portion of an instruction, module, the program segment, or a portion of the instruction includes one or more executable instructions for implementing principles. In some alternative implementations, the functions noted in the blocks may also occur in a different order than those illustrated in the drawings. For example, two consecutive blocks may be executed substantially in parallel, and they may sometimes be executed in a reverse order, depending upon the functionality involved. It is also noted that each block of the block diagrams and/or flowcharts, and combinations of blocks in the block diagrams and/or flowcharts, can be implemented in a dedicated hardware-based system that performs the specified function or action of principle or can be implemented with a combination of dedicated hardware and computer instructions.

The embodiments of the present disclosure have been described above, and the foregoing description is illustrative, not limiting, and not limited to the disclosed embodiments. Numerous modifications and changes will be apparent to those skilled in the art without departing from the scope of the invention. The choice of terms used herein is intended to best explain the principles, practical applications, or technical improvements of the techniques on the market, or enable other ordinary technical staffs in the art to understand the embodiments in the disclosure.

We claim:

1. A method for managing a storage system, comprising:
   at a second device:
      in response to receiving a command to failback a first device, determining a snapshot synchronized between the second device and the first device before a failure of the first device, wherein the first device has been failed over to the second device;
      causing the first device to be restored based on the snapshot;
      determining a change in latest data of the second device relative to the snapshot; and
      synchronizing the change to the first device,
   wherein determining the snapshot comprises:
      obtaining a first identifier list of snapshots on the second device for sending to the first device; and
      receiving an identifier of the snapshot from the first device, wherein the identifier is determined by the first device based on a latest identifier of identifiers in each of the first identifier list and a second identifier list of snapshots on the first device.

2. The method of claim 1, wherein receiving the identifier includes:

acquiring, as the identifier of the snapshot, a universally unique identifier (UUID) signature which identifies a particular sync replicated snapshot on the second device matching a latest common base on the first device.

3. The method of claim 1, wherein determining the change comprises:
obtaining a record indicating a storage region that is updated in the second device from the failure of the first device; and
determining the change based on the record.

4. The method of claim 1, further comprising:
in response to the change being synchronized to the first device, receiving a write request from the first device, wherein the first device receives the write request from an application.

5. The method of claim 1, further comprising:
sending a request to the first device to establish a mirror of a predetermined storage region of the second device on the first device; and
in response to determining the change, synchronizing the change to the mirror on the first device.

6. A method for managing a storage system, comprising:
at a first device:
determining a snapshot synchronized between a second device and the first device before a failure of the first device, wherein the first device has been failed over to the second device;
restoring the first device based on the snapshot; and
receiving a change in the latest data on the second device relative to the snapshot from the second device to synchronize the change to the first device;
wherein determining the snapshot comprises:
receiving a first identifier list of snapshots on the second device from the second device;
obtaining a second identifier list of snapshots on the first device;
determining identifiers in each of the first identifier list and the second identifier list; and
determining the snapshot based on a latest identifier of the identifiers.

7. The method of claim 6, further comprising:
providing, as the latest identifier, a universally unique identifier (UUID) signature to the second device, the UUID signature identifying a particular sync replicated snapshot on the second device that matches a latest common base on the first device.

8. The method of claim 6, wherein the change is determined based on a record indicating a storage region that is updated in the second device from the failure of the first device.

9. The method of claim 6, further comprising:
in response to synchronizing the change to the first device, receiving a write request from an application and sending the write request to the second device.

10. The method of claim 6, further comprising:
in response to receiving, from the second device, a request to establish a mirror of a predetermined storage region of the second device, initializing a predetermined storage region on the first device with a same size as the predetermined storage region of the second device; and
in response to receiving the change, synchronizing the change to the predetermined storage region of the first device.

11. A device for managing a storage system, comprising:
a processing unit; and
a memory coupled to the processing unit and comprising instructions stored thereon, the instructions, when executed by the processing unit, causing the device to perform acts comprising:
in response to receiving a command to failback another device, determining a snapshot synchronized between the device and the other device before a failure of the other device, wherein the other device has been failed over to the device;
causing the other device to be restored based on the snapshot;
determining a change in latest data of the device relative to the snapshot; and
synchronizing the change to the other device;
wherein determining the snapshot comprises:
obtaining a first identifier list of snapshots on the device for sending to the other device; and
receiving an identifier of the snapshot from the other device, wherein the identifier is determined by the other device based on a latest identifier of identifiers in each of the first identifier list and a second identifier list of snapshots on the other device.

12. The device of claim 11, wherein receiving the identifier includes:
acquiring, as the identifier of the snapshot, a universally unique identifier (UUID) signature which identifies a particular sync replicated snapshot on the second device matching a latest common base on the first device.

13. The device of claim 11, wherein determining the change comprises:
obtaining a record indicating a storage region that is updated in the device from the failure of the other device; and
determining the change based on the record.

14. The device of claim 11, wherein the acts further comprise:
in response to the change being synchronized to the other device, receiving a write request from the other device, wherein the other device receives the write request from an application.

15. The device of claim 11, wherein the acts further comprise:
sending a request to the other device to establish a mirror of a predetermined storage region of the device on the other device; and
in response to determining the change, synchronizing the change to the mirror on the other device.

16. A device for managing storage system, comprising:
a processing unit; and
a memory coupled to the processing unit and comprising instructions stored thereon, the instructions, when executed by the processing unit, causing the device to perform acts comprising:
determining a snapshot synchronized between another device and the device before a failure of the device, wherein the device has been failed over to the other device;
restoring the device based on the snapshot; and
receiving a change in the latest data on the other device relative to the snapshot from the other device to synchronize the change to the device;
wherein determining the snapshot comprises:
receiving a first identifier list of snapshots on the other device from the other device;
obtaining a second identifier list of snapshots on the device;

determining identifiers in each of the first identifier list and the second identifier list; and determining the snapshot based on a latest identifier of the identifiers.

17. The device of claim 16, wherein the acts further comprise:

providing, as the latest identifier, a universally unique identifier (UUID) signature to the second device, the UUID signature identifying a particular sync replicated snapshot on the second device that matches a latest common base on the first device.

18. The device of claim 16, wherein the change is determined based on a record indicating a storage region that is updated in the other device from the failure of the device.

19. The device of claim 16, wherein the acts comprise:

in response to synchronizing the change to the device, receiving a write request from an application and sending the write request to the other device.

20. The device of claim 16, wherein the acts comprise:

in response to receiving, from the other device, a request to establish a mirror of a predetermined storage region of the other device, initializing a predetermined storage region on the device with a same size as the predetermined storage region of the other device; and in response to receiving the change, synchronizing the change to the predetermined storage region of the device.

21. A computer program product having a non-transitory computer readable medium which stores a set of instructions to manage a storage system; the set of instructions, when carried out by computerized circuitry, causing the computerized circuitry to perform a method of:

at a second device:

in response to receiving a command to failback a first device, determining a snapshot synchronized between the second device and the first device before a failure of the first device, wherein the first device has been failed over to the second device;

causing the first device to be restored based on the snapshot;

determining a change in latest data of the second device relative to the snapshot; and synchronizing the change to the first device;

wherein determining the snapshot comprises:

obtaining a first identifier list of snapshots on the second device for sending to the first device; and receiving an identifier of the snapshot from the first device, wherein the identifier is determined by the first device based on a latest identifier of identifiers in each of the first identifier list and a second identifier list of snapshots on the first device.

22. A computer program product having a non-transitory computer readable medium which stores a set of instructions to manage a storage system; the set of instructions, when carried out by computerized circuitry, causing the computerized circuitry to perform a method of:

at a first device:

determining a snapshot synchronized between a second device and the first device before a failure of the first device, wherein the first device has been failed over to the second device;

restoring the first device based on the snapshot; and receiving a change in the latest data on the second device relative to the snapshot from the second device to synchronize the change to the first device;

wherein determining the snapshot comprises:

receiving a first identifier list of snapshots on the second device from the second device;

obtaining a second identifier list of snapshots on the first device;

determining identifiers in each of the first identifier list and the second identifier list; and determining the snapshot based on a latest identifier of the identifiers.

\* \* \* \* \*